Oct. 16, 1945. G. OLAH 2,387,174
ELECTRIC FOLLOW-UP MECHANISM
Filed July 14, 1943 5 Sheets-Sheet 2
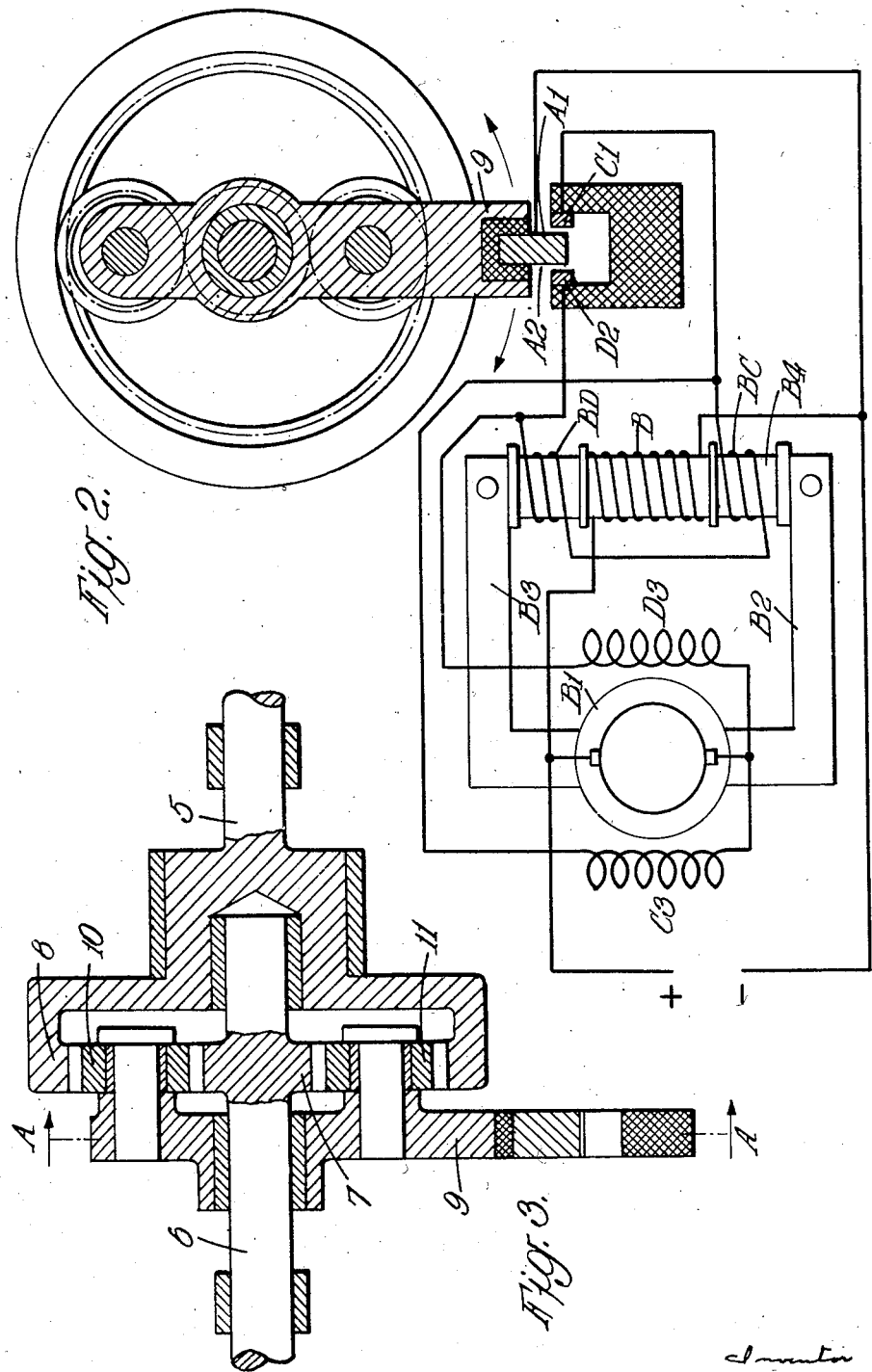

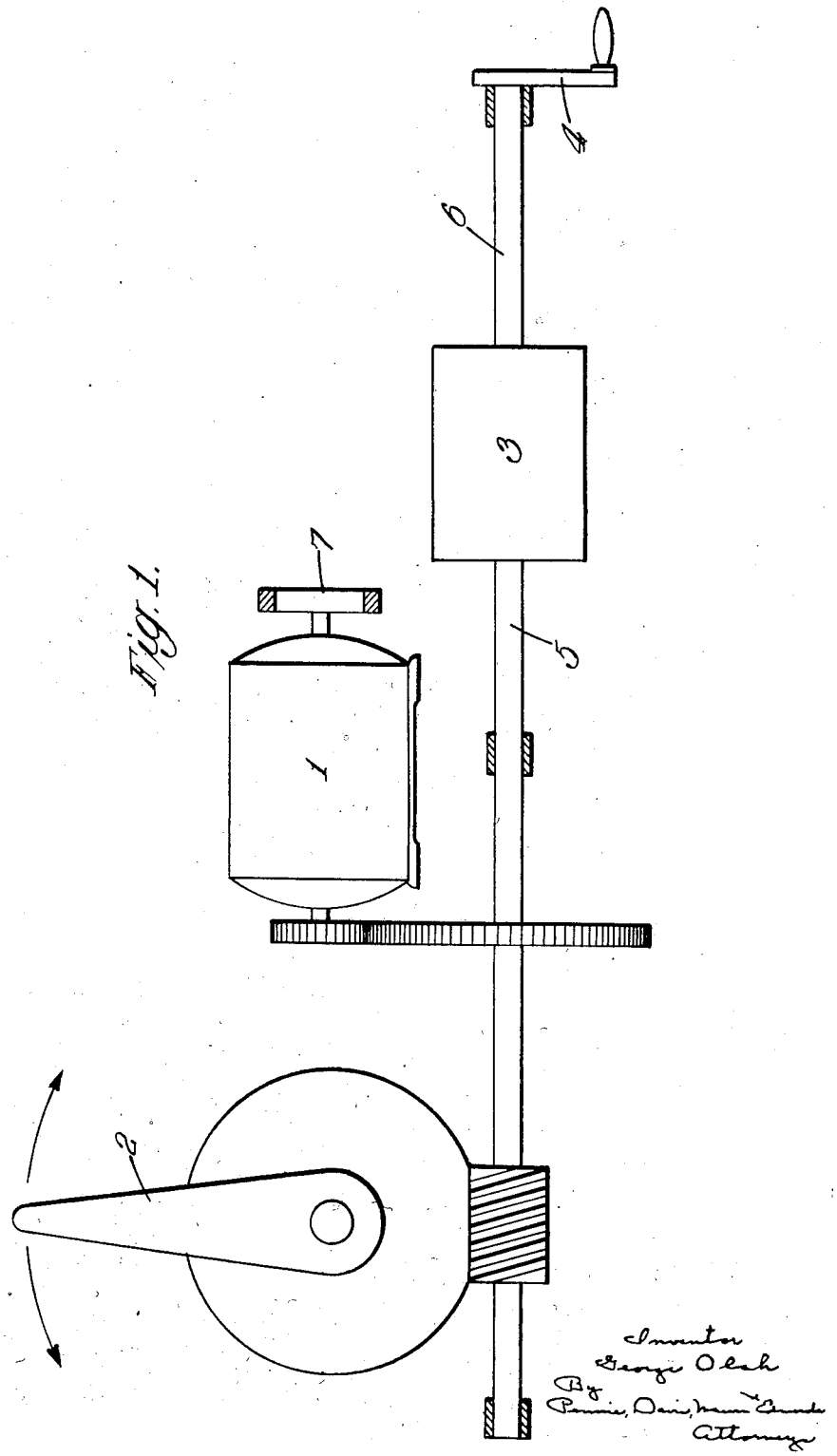

Oct. 16, 1945.  G. OLAH  2,387,174
ELECTRIC FOLLOW-UP MECHANISM
Filed July 14, 1943  5 Sheets-Sheet 3

Inventor
George Olah
By
Pennie, Davis, Marvin & Edmonds
Attorneys

Oct. 16, 1945.   G. OLAH   2,387,174
ELECTRIC FOLLOW-UP MECHANISM
Filed July 14, 1943   5 Sheets-Sheet 4

Inventor
George Olah
By
Pennie, Davis, Marvin & Edmonds
Attorneys

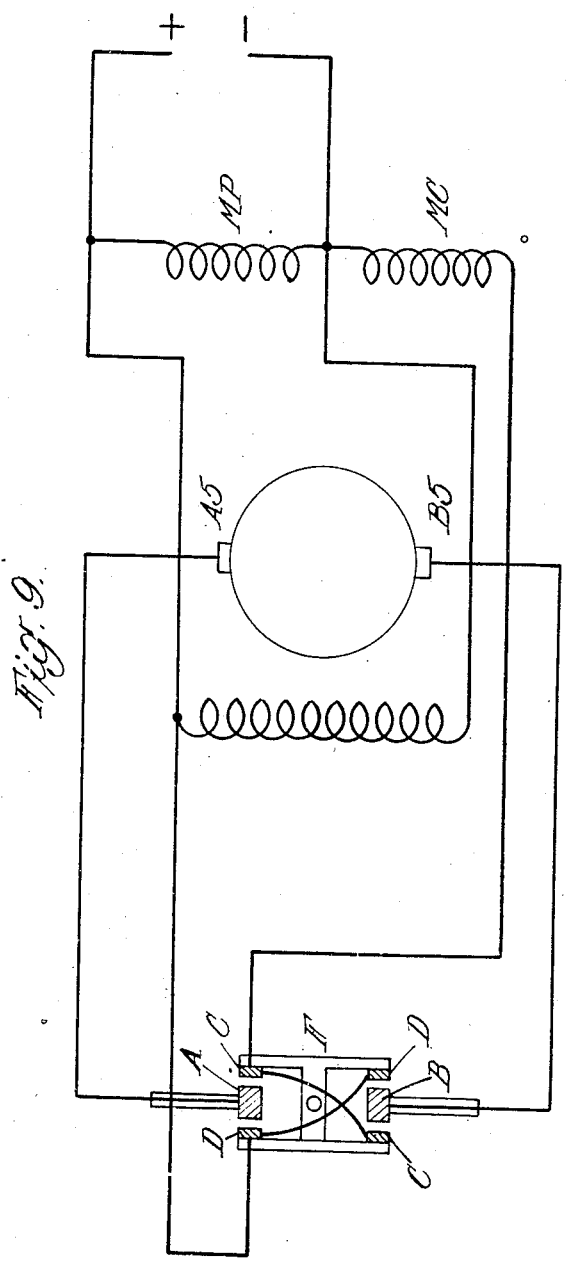

Patented Oct. 16, 1945

2,387,174

UNITED STATES PATENT OFFICE 2,387,174

ELECTRIC FOLLOW-UP MECHANISM

George Olah, London, England, assignor to Precision Developments Company Limited, London, England, a corporation of Great Britain Application July 14, 1943, Serial No. 494,735
In Great Britain April 29, 1942

6 Claims. (Cl. 192—2)

This invention relates to braking mechanisms for electric motors and is particularly applicable to electric follow-up mechanisms. Electric follow-up mechanism having the following features are known in the art. The motion of a low powered controlling member is assisted by an electric servo-motor, the power input and the direction of motion of which are controlled by an electrical switch, acting in such manner that when the servo-motor lags behind the controlling member, the servo-motor receives a power supply, which accordingly tends to accelerate its speed. If, on the other hand, the servo-motor gains on the controlling member, its speed is reduced due to the action of the follow-up switch, which interrupts or reverses the operating circuit of the servo-motor.

When the controlling member is at a standstill and a load is imposed on the servo-motor, the load will tend to move the servo-motor relative to the controlling member. This motion makes a contact at the follow-up switch by which the servo-motor obtains a power supply, due to which the latter tends to move in a direction opposite to the initial motion caused by the load.

By this motion the contact is interrupted, the load then makes a new contact and the process is repeated as described above.

It is obvious that under these conditions the arrangement is subjected to continuous oscillations which are mechanically inconvenient. Furthermore, they cause a deterioration of contacts.

It is an object of the present invention to provide an improved braking mechanism for an electric motor which allows for avoiding difficulties arising from oscillations in the follow-up mechanism without necessitating considerable increase in power. A further object of this invention is to provide simple means by which in case of failure of the electric supply the controlled unit may be freely moved by other means.

A still further object of the present invention is to achieve the above improvement by electro-mechanical means which are light in weight and small in size, which do not require excessive precision in manufacture and do not deteriorate rapidly through wear in use.

According to the present invention, a braking mechanism for an electric motor comprises a brake member connected to the motor shaft for rotation thereby, an electro-magnetically operated friction brake positioned to apply a braking action on the brake member, electrical connections for the electric motor and the electro-magnetically operated brake including a coil connected across the electric supply terminals for the electric motor for generating the magnetic force for applying the brake, and at least one compensating coil counteracting the magneto-motive forces of the first-mentioned coil whenever the electric motor is in circuit, whereby a braking action is exerted on the brake member when the electric motor is disconnected from the supply of electric current, but said first-mentioned coil still is connected thereto, and no braking action is exerted on the brake member either when the motor is in circuit or the supply of electric current to said first-mentioned coil is interrupted.

The improved brake thus consists of a member rotating with the rotor of the servo-motor and of friction members pressed against the said rotating member by magnetic forces generated by a coil connected permanently across two supply terminals. The pressure is therefore released in the event of an interruption of the supply. The brake has furthermore one or more compensating coils which when put in circuit by suitable connections simultaneously with the servo-motor counteract the magneto-motive force of the first coil and release the brake.

The fact that the pressure between the brake drum and the friction member is applied by magnetic forces makes it possible to position the surface where this force is generated adjacent to the friction surface because the magnetic circuit can be conducted through the brake drum itself, provided part of it be made of suitable magnetic material.

This obviates the necessity of a braking mechanism with links, pivots and other members liable to yield and distort and necessitating clearances for easy operation.

Thus as the friction member itself requires practically no displacement in order to apply or release the pressure force, very little movement is taking place in the magnetic field and the magnetic circuit is utilised under the most favourable conditions of a portative magnet since no work has to be performed.

Moreover the absence of appreciable movement eliminates one source of time lag, namely that due to mechanical inertia, and consequently the action of the brake is accelerated.

In order that the present invention may be more clearly understood and readily applied a few forms thereof will now be described by way of example with reference to the accompanying drawings, in which Fig. 1 shows diagrammatically an arrangement in which an electric servo-motor is controlled by a follow-up switch to achieve positional correspondence between an input handle and an output shaft and an electro-magnetically controlled friction brake is applied to the servo-motor.

Figs. 2 and 3 show one type of follow-up switch and the electric circuit which incorporates a magnetic brake in accordance with the invention, part of Fig. 2 being a section on the line A—A of Fig. 3.

Fig. 9 shows in diagrammatic form a simplification of the arrangement in which only two magnet coils are used.

Figure 4:
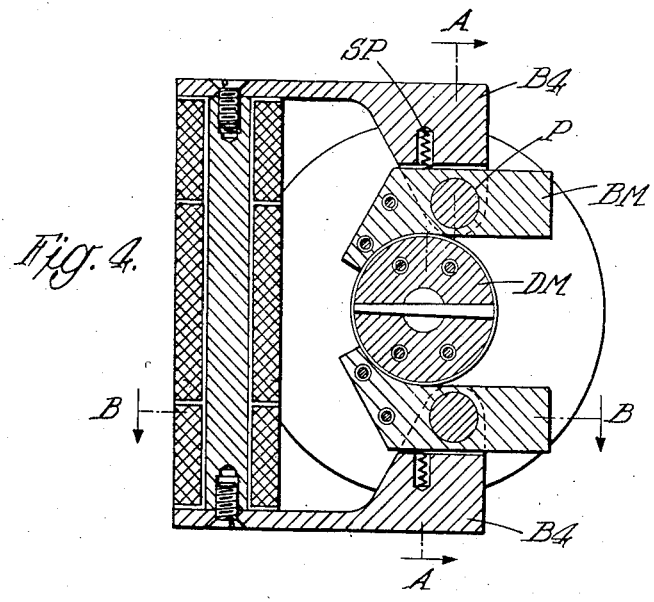
Figs. 4, 5 and 6 show in detail one form of the electromagnetic brake mounted on an extension of the servo-motor shaft, Fig. 5 being a section on the line A—A of Fig. 4 and Fig. 6 a section on the line B—B of Fig. 4.

In Fig. 1, I indicates the electric servo-motor driving a movable object 2 (such as a ship's rudder) which is controlled by a follow-up switch 3 to achieve positional correspondence between an input handle 4 on an input shaft 6 and an output shaft 5. An electro-magnetically controlled friction brake 7 is applied to a shaft extension of the servo-motor.

The embodiment illustrated in Figs. 2 and 3 is characterised by a twin field electric motor in conjunction with a single pole change over switch as a follow up switch, by a brake control using three separate coils and by a stationary arrangement of all contact carrying elements.

Figure 6:
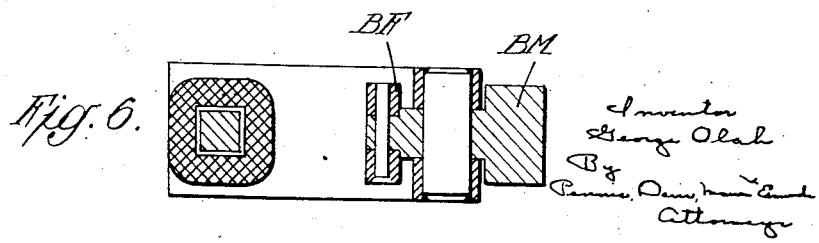

Referring to Figs. 2 and 3, 6 is the input shaft corresponding to that in Fig. 1 on which is mounted the sun pinion 7 of a planetary gear train the sun gear 8 being mounted on the output shaft 5.

The planetary member 9 floating freely on the input shaft carries the planet pinions 10, 11 and an insulated contact member A in the form of a bar having oppositely disposed contact surfaces A1, A2 which at the two limiting positions of the planetary member 9, cooperate with two contacts C1 and D2 located in a circuit hereinafter described.

The contact member A as shown is connected to one pole of a D. C. supply, the other pole is led through the armature of the servo-motor 1 and branches off into the two field coils C3, D3 which are wound for the two directions of rotation of the servo motor, the other ends of the field coils being connected to the two contacts C1 and D2.

The brake is shown diagrammatically as consisting of a brake drum B1 keyed to the shaft of the servo-motor, two brake-shoes B2 and B3 pivoted on the core member B4 and three coils B, BC and BD. Coil B is connected across the supply terminals, coil BC is connected between one supply terminal and contact C1 and coil BD between one supply terminal and contact D2. All three coils are shown to be wound in the same sense around the core. The magnetic circuit of the brake is completed through the core, the brake-shoes and the brake-drum.

In operation of the device, so long as there is no motion in either the input shaft 6 or the output shaft 5 both contact pairs A1, C1 and A2, D2 are interrupted. Coil B is in circuit and its ampere turns cause a magnetic flux to be established through the brake-drum and brake-shoes, which generates a pressure by attraction between the brake-drum and brake-shoes. The resulting friction holds the servo-motor shaft in position against any static load that may be exerted by the movable object.

When the input shaft 6 is moved clockwise by handle 4 (Fig. 1) the output shaft 5 being at a standstill, the planetary member 9 moves clockwise until contact surface A1 is pressed against contact C1 which establishes a circuit through the field coil C3 and the armature of the servo-motor. At the same time coil BC is energized and passes current in the reverse direction to coil B, neutralizing its magneto-motive force. The pressure between the brake shoes and the brake-drum is relieved and the servo-motor starts rotating in a sense which causes the output shaft 5 and sun pinion 7 to move anti-clockwise until its movement in the proper proportion of the gear train overtakes the movement of the input shaft 6 and causes the planetary member to rock anticlockwise and separate contacts A1, C1. The motor circuit is now interrupted together with the parallel circuit through the compensating coil BC. The flux in the magnetic circuit and the pressure on the brake drum are reestablished and the servo-motor is decelerated rapidly until further movement of the input shaft 6 again closes contact A1, C1, relieves the brake friction and restarts the servo-motor.

The reverse sequence of events occurs on anti-clockwise movement of the input shaft as will be understood.

Figure 5:
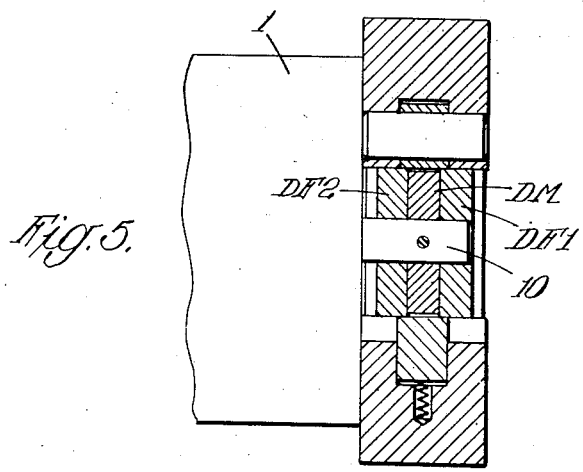

Figs. 4, 5 and 6 show one construction of the brake in greater detail. On the extension 10 of the shaft of the servo-motor 1 are fastened three discs DM, DF1 and DF2 of which disc DM serves to conduct the magnetic flux while DF1 and DF2 are friction discs.

The brake shoes are composed of a member BM of magnetically soft material for the conduction of magnetic flux and of friction pads BF.

In the arrangement shown the friction pads BF on the brake shoes are machined together with the magnetic part BM to form one cylindrical surface. The disc DM is slightly smaller in diameter than the friction discs DF1 and DF2. It is easy by normal machining methods to ensure a small difference in diameter with the necessary accuracy. This arrangement serves to preserve the fundamental advantages referred to above for the conduction of the magnetic flux through the brake-shoes, but ensures that the airgap in the magnetic circuit is never reduced to zero which would cause the brake-shoes to adhere to the drum due to the slightest traces of remanent magnetism in the circuit. It also enables the selection of more suitable materials for the friction surfaces than those which can be employed to conduct magnetic flux.

To avoid overdimensioning or slippage of the brake at standstill, as well as jerky action or welding of the friction surfaces during braking, it is advisable to use a material which has a substantially higher coefficient of static friction than sliding friction and which provides a certain amount of self-lubrication to avoid wear which would soon reduce the minimum airgap in the magnetic circuit below the permissible value.

Consequently the friction pad may be made with advantage from oil-impregnated porous metal or metal and graphite mixtures. The friction discs on the other hand may consist of non-magnetic wear resistant material such as phosphor bronze or better still the heat treatable copper alloys of the beryllium copper or nickel copper type.

In the particular design shown care is also taken to eliminate any possible gravity bias on the brake-shoes by statically balancing them around their pivots P. To ensure that when the magnetic forces are absent the brake-shoes should not separate from the drum a slight bias is provided by a small spring SP situated in the brake-shoe holders B4 which form part of the magnetic circuit.

Instead of cylindrical friction surfaces any other type of rotary surfaces including plain surfaces, bevel surfaces or V grooves may be used.

The arrangement described in Figs. 2 and 3 can be modified in many ways. It should further be understood as an example of circuit connections where a single pole follow up switch and a twin field motor are used. In particular any kind of single pole follow-up switch can be employed whether stationary or rotating.

Figure 7:
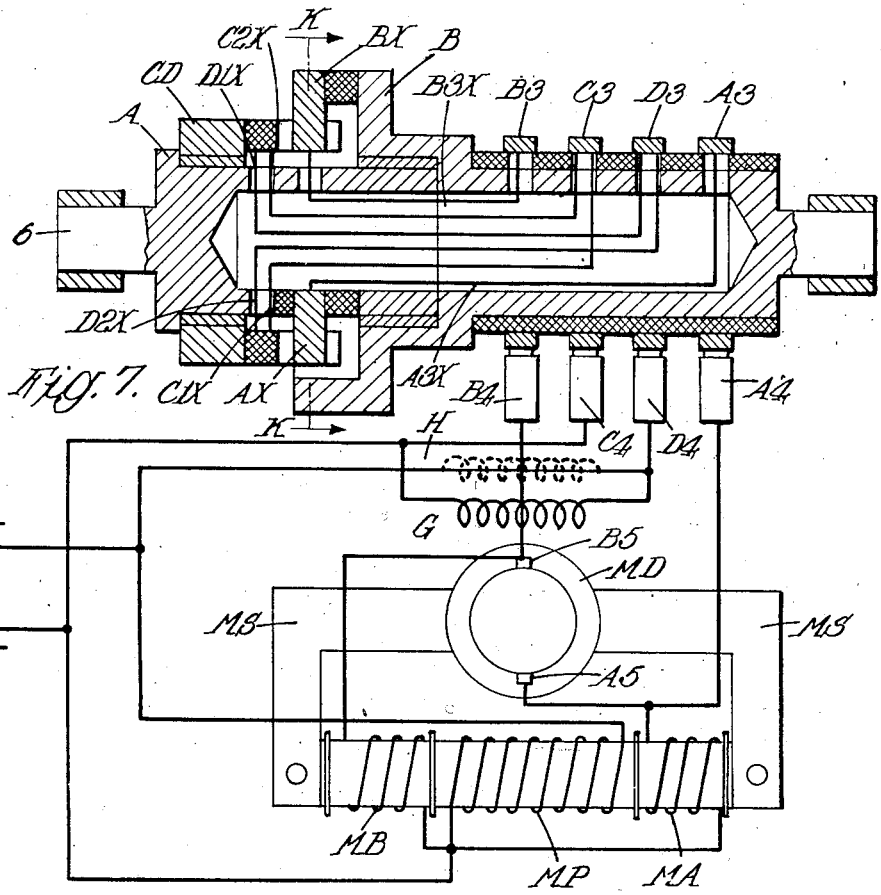
Figs. 7 and 8 show an application of the invention to an arrangement using a two pole change-over switch as a reversing switch in a follow-up control, Fig. 8 being a section on the line K—K of Fig. 7.
Figure 8:
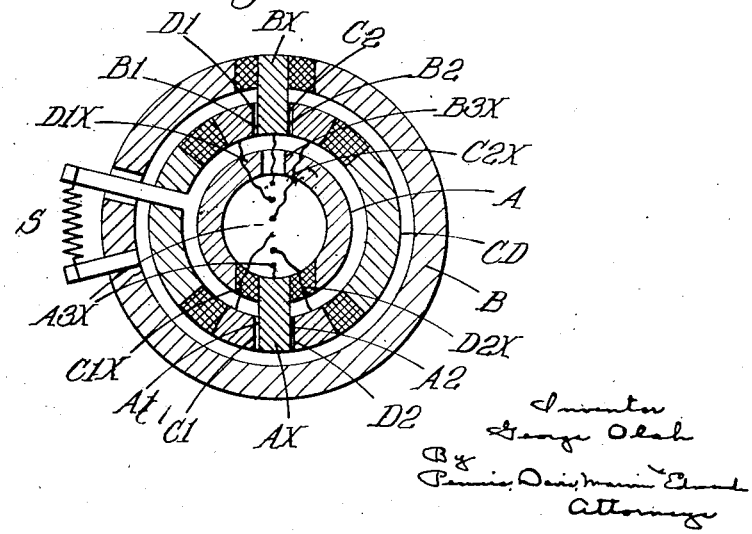

In Figs. 7 and 8 the invention is shown applied to an arrangement using a two pole change over switch as a reversing switch in a follow up control.

The follow up switch as shown in these figures is of the type described in a copending appliication in which a floating member distributes contact pressure equally between the two contacts at each end of the airgap. Of the many possible types of such follow up switches a rotating switch is shown in Figs. 7 and 8.

As shown, the input member A consisting of a hollow cylinder mounted on the input shaft 6 carries a radially extending insulated contact member AX in the form of a bar with two contact surfaces A1 and A2 on opposite sides. This contact member is connected by a flexible wire A3X to the slip ring A3 which cooperates with a brush A4 connected to a collector brush A5 of the servo motor 1 shown as a D. C. motor.

The output or follow up member B consisting of a hollow cylinder sleeving the member A and in one with the output shaft 6 carries a radially extending insulated contact member BX in the form of a bar having two opposite contact surfaces B1 and B2 and connected by a flexible wire B3X to a slip ring B3 cooperating with a brush B4 which is connected to the opposite commutator brush B5 of the motor 1.

Between the two members A and B there is interposed a floating member CD which carries four insulated contact members with contact surfaces C1, D2 between which bar AX projects and C2, D1 between which the bar BX projects.

The contacts C1, C2 are both connected by flexible wires C1X and C2X respectively to slipring C3 cooperating with brush C4 while the contacts D1, D2 are connected by flexible wires D1X and D2X to slip ring D3 cooperating with brush D4. The brushes C4, D4 receive the two poles of an electric D. C. supply.

The contact surfaces are so adjusted that when the floating member CD is in its central position there is an air gap between all of the cooperating contact surfaces sufficient to provide insulation against the voltage of the circuit.

The brake which in its mechanical details is identical with that described with reference to Figs. 2 and 3 is controlled by three coils. The coil MP is permanently connected to the 2 supply poles. It is therefore energized as long as the supply is on and sends a flux through the magnetic circuit which causes the brake-shoes MS to be applied to the brake-drum MD. The other two coils MA and MB are connected between one supply terminal in common with coil MO and each of the brushes A5 and B5.

In operation, when the controlling member 4 of Fig. 1 moves clockwise, contact A1 is pressed against contact C1. The floating member CD is driven through the remaining part of the airgap and contact D1 is pressed against B1. A circuit is now established through the armature of the servomotor and the current generates a torque in the motor.

At the same time brake coil MB is energised and being wound to balance the magnetmotive force of coil MP the brake is released and the motor starts driving the output member B clockwise. As soon as the motor overtakes the input drive the contacts separate, the circuit is interrupted, coil MB is de-energised, and the brake is applied rapidly decelerating the motor until it is again overtaken by the input member.

Following the movement of the controlling member in the opposite direction it will be observed that the polarity of the brushes is reversed whereupon the servo motor starts its movement in the opposite sense.

When the controlling member of the follow up mechanism is at a standstill, the freely floating unbiased member CD may have any position relative to members AB with the exception of position relative to members AB with the exception of positions giving simultaneously contacts C1, A1 and D1, B1 or D2, A2 and B2, C2 which contacts would cause the servo motor to move the output member and thus interrupt at least one of the said contacts. In particular, a position of the freely floating member is possible in which either contacts D2, A2 or D1, B1 or both of these contacts are simultaneously established. In either of these cases the coils MB and MC will both be in circuit together with coil MP and three coils being simultaneously in circuit would leave the magnetic circuit unbalanced, will leave the brake on and will thus not upset the main function of the arrangement but comparatively high current consumption at standstill and an overheating of the coils may occur.

In order to prevent the connections D2, A2 and/or D1, B1 being established at standstill a spring bias S or the like between the floating member CD and the input member A or alternatively between the floating member CD and the output member B may be provided. This spring bias produces either a contact A1, C1 or C2, B2 at standstill which contacts do not establish current through coils MB and MA. Using this arrangement coils MB and MA need not be dimensioned for continuous rating thus largely reducing the size of the solenoids.

Numerous modifications of the arrangement shown in Figs. 7 and 8 are possible. In particular the mechanical details of the follow up switch may be altered. Likewise the motor field may be connected either across the supply as indicated by coil G or in series with the armature as indicated in dotted lines by coil H or a compound field may be used.

The embodiment as described is essentially characterised by the use of a double pole follow up switch and a three coil brake.

Referring now to Fig. 9, F indicates a double pole follow up switch. The motor brushes A5, B5 are connected to the contacts A, B and the two supply poles to contacts C, D. The motor field is connected across the supply terminals as well as the permanent brake coil MP.

One compensating brake coil MC is connected in series with the armature when the input contact A is moved and contacts AC and BD or AD and AC are closed. The brake is released when the motor is in circuit but compensation is complete only for a certain motor speed. Since the magnetic force, however, is proportional to the square of the magnetomotive force it is obvious that a small residue of ampere turns will not generate a substantial braking effect.

In this arrangement again the motor field may be across the supply or in series with the armature or a compound field may be used.

I claim:

1. A braking mechanism for an electric motor comprising a brake member connected to the motor shaft for rotation thereby, an electromagnetically operated friction brake positioned to apply a braking action on the brake member, electrical connections for the electric motor and the electro-magnetically operated brake including a coil connected across the electric supply terminals for the electric motor for generating the magnetic force for applying the brake, and at least one compensating coil counteracting the magneto-motive forces of the first-mentioned coil whenever the electric motor is in circuit, whereby a braking action is exerted on the brake member when the electric motor is disconnected from the supply of electric current, but said first-mentioned coil still is connected thereto, and no braking action is exerted on the brake member either when the motor is in circuit or the supply of electric current to said first-mentioned coil is interrupted.

2. A braking mechanism for a reversible electric motor having two field coils wound in opposite senses, one for each direction of rotation of the motor, and connected, respectively, between the motor armature and one contact of a single-pole, change-over, follow-up switch, comprising a brake member connected to the motor shaft for rotation thereby, an electromagnetically operated friction brake positioned to apply a braking action on the brake member, electrical means for the electric motor and the electro-magnetically operated brake including a coil connected across the electric supply terminals for the electric motor for generating the magnetic force for applying the brake, and two compensating coils, each connected across one of the field coils of the motor and the motor armature in series, whereby a braking action is exerted on the brake member when the electric motor is disconnected from the supply of electric current, but said first-mentioned coil still is connected thereto, and no braking action is exerted on the brake member either when the motor is in circuit or the supply of electric current to said first-mentioned coil is interrupted.

3. A braking mechanism for a reversible electric motor having two commutator brushes and operated by a two-pole, change-over, follow-up switch which commutates two supply poles of an electric circuit with the two commutator brushes, comprising a brake member connected to the motor shaft for rotation thereby, an electromagnetically operated friction brake positioned to apply a braking action on the brake member, electrical connections for the electric motor and the electromagnetically operated brake including a coil connected across the electric supply terminals for the electric motor for generating the magnetic force for applying the brake, and a compensating coil in series with the motor armature for counteracting the magneto-motive forces of the first-mentioned coil whenever the electric motor is in circuit, whereby a braking action is exerted on the brake member when the electric motor is disconnected from the supply of electric current, but said first-mentioned coil still is connected thereto, and no braking action is exerted on the brake member either when the motor is in circuit or the supply of electric current to said first-mentioned coil is interrupted.

4. A braking mechanism for a reversible electric motor having two commutator brushes and operated by a two-pole, change-over, follow-up switch which commutates two supply poles of an electric circuit with the two commutator brushes, comprising a brake member connected to the motor shaft for rotation thereby, an electromagnetically operated friction brake positioned to apply a braking action upon the brake member, electrical connections for the electric motor and the electro-magnetically operated brake including a coil connected across the electric supply terminals for the electric motor for generating the magnetic force for applying the brake, and two compensating coils connected between one common supply terminal and each of the commutator brushes for counteracting the magneto-motive forces of the first-mentioned coil whenever the electric motor is in circuit, whereby a braking action is exerted on the brake member when the electric motor is disconnected from the supply of electric current, but said first-mentioned coil still is connected thereto, and no braking action is exerted on the brake member either when the motor is in circuit or the supply of electric current to said first-mentioned coil is interrupted.

5. A braking mechanism for an electric motor as set forth in claim 1 in which the supply of electric current to the motor includes a first member, a second member, a member floating between said first and second members, and electric contact surfaces carried by said first and second members and the floating member for completing an electric circuit to the motor when either the first or second member is moved a predetermined distance relative to the other.

6. A braking mechanism for an electric motor as set forth in claim 4 in which the supply of electric current to the motor includes a first member, a second member, a member floating between said first and second members, and electric contact surfaces carried by said first and second members and the floating member for completing an electric circuit to the motor when either the first or second member is moved a predetermined distance relative to the other.

GEORGE OLAH.